United States Patent [19]

Lee

[11] Patent Number: 5,374,075

[45] Date of Patent: Dec. 20, 1994

[54] VEHICLE SUSPENSION MOUNTING FOR CONTROLLING CHANGE IN CAMBER AND TREAD

[75] Inventor: Unkoo Lee, Anyang, Rep. of Korea

[73] Assignee: Hyundai Motor Company, Seoul, Rep. of Korea

[21] Appl. No.: 155,831

[22] Filed: Nov. 23, 1993

[30] Foreign Application Priority Data

Nov. 24, 1992 [KR] Rep. of Korea ............... 92-22193

[51] Int. Cl.⁵ .............. B60G 7/02; B60G 3/06; B60G 15/07
[52] U.S. Cl. .................. 280/668; 280/673; 280/697; 280/692; 280/663
[58] Field of Search .......... 280/673, 663, 661, 690, 280/697, 701, 675, 666, 668, 698, 691, 692, 693, 696, 670, 672, 662; 267/228, 248, 256

[56] References Cited

U.S. PATENT DOCUMENTS

| 3,417,835 | 12/1968 | Tenniswood | 280/701 |
| 3,771,813 | 11/1973 | Stotz | 280/697 |

FOREIGN PATENT DOCUMENTS

| 0316285 | 5/1989 | European Pat. Off. | 280/661 |
| 0218408 | 12/1983 | Japan | 280/673 |
| 0132406 | 6/1986 | Japan | 280/691 |
| 0263113 | 10/1988 | Japan | 280/673 |
| 0056214 | 3/1989 | Japan | 280/673 |
| 0056215 | 3/1989 | Japan | 280/673 |

Primary Examiner—Mitchell J. Hill
Assistant Examiner—Peter C. English
Attorney, Agent, or Firm—Birch, Stewart, Kolasch & Birch

[57] ABSTRACT

A suspension system which can simultaneously enhance ride comfort, cornering safety and running safety by optimally controlling the change of the camber in accordance with travelling conditions, wherein the suspension includes a wheel carrier for supporting a wheel; a strut assembly formed by uniting a shock absorber and a spring, the strut assembly including a lower end integrally connected with the wheel carrier and an upper end supportably connected with a vehicle body; a lower arm for connecting a lower side of the wheel carrier to the vehicle body or subframe; an arrangement for controlling the chamber by gradually pushing the lower arm outward when the lower arm moves upward, the arrangement being formed at the vehicle body side connecting portion of the lower arm and including a bracket having an arcuate elongated hole having an upper portion inclined in the outward direction, an elastic bushing having an eccentric axle hole which is inserted in the vehicle body side connecting portion of the lower arm, and a roll member projecting from a portion of the lower arm which corresponds to the elongated hole and inserted into the elongated hole.

3 Claims, 3 Drawing Sheets

FIG.3
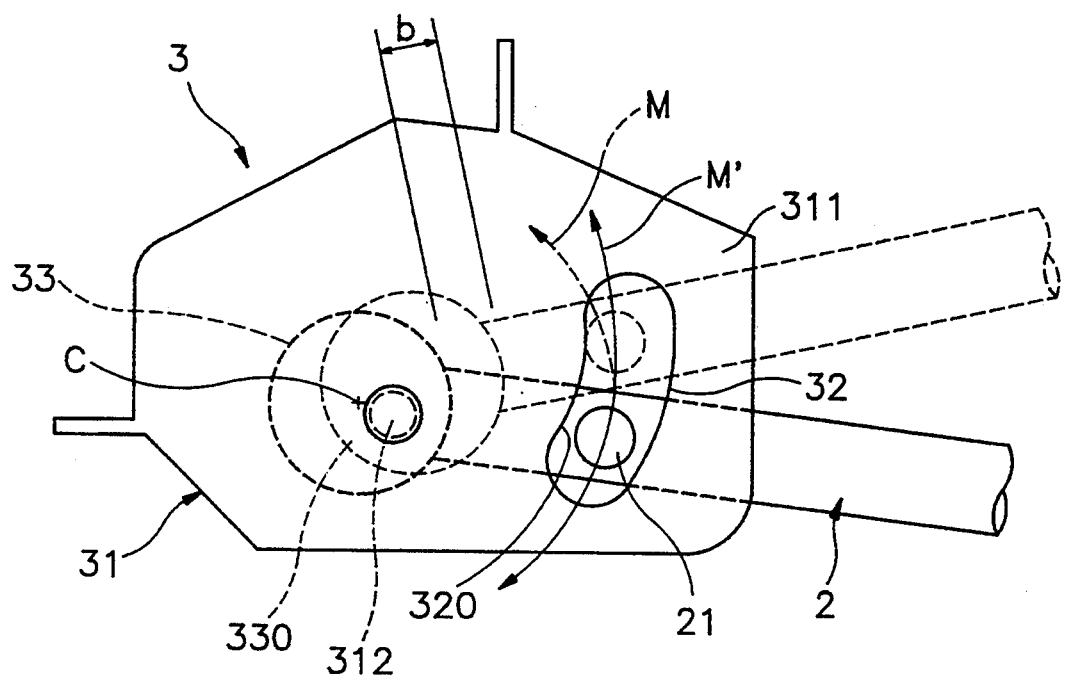
FIG.4A
FIG.4B
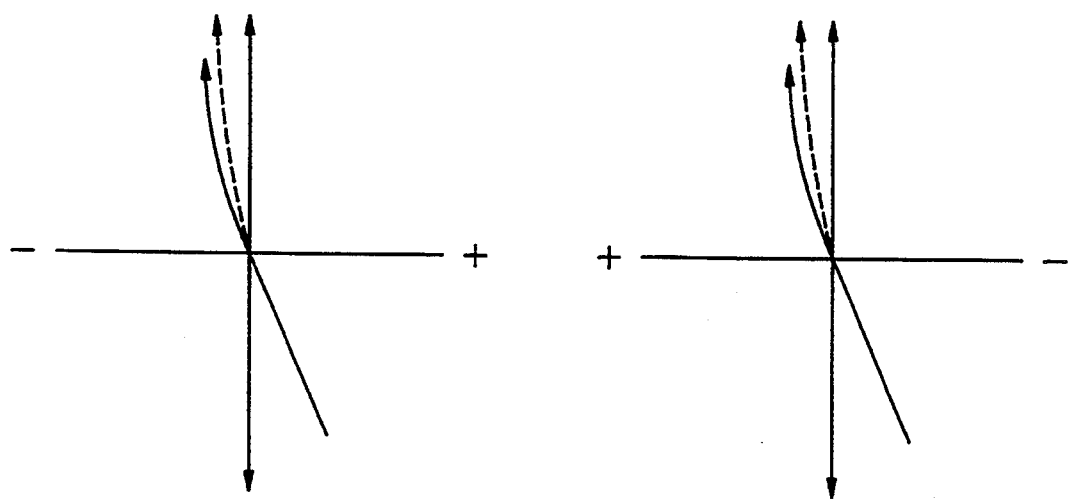

VEHICLE SUSPENSION MOUNTING FOR CONTROLLING CHANGE IN CAMBER AND TREAD

BACKGROUND OF THE INVENTION

1. Field of the Invention

The present invention relates to a suspension system for a vehicle and, more particularly, to a suspension system which can enhance running safety, cornering safety and ride comfort by optimally controlling the change of a camber in accordance with the vehicle's travelling conditions.

2. Description of Related Art

In general, a vehicle suspension connects an axle shaft and a vehicle body to each other and absorbs impact and vibration from a road surface to increase riding comfort and running safety. To absorb the impact from the road surface, a connection of upper and lower parts of the suspension should be flexible, and to cope with driving and breaking forces applied to a wheel and a centrifugal force in a vehicle's turning, a connection in the horizontal direction of the suspension should be durable.

The suspension system is structurally characterized as an integral shaft suspension and an independent suspension. The suspension of the present invention concerns an independent suspension. There are MacPherson strut type suspensions and Wishbone type suspension systems in the suspension systems.

As shown in FIG. 5, the conventional MacPherson strut type suspension system comprises a strut assembly 55, a shock absorbing means, consisting of a shock absorber 51 and a spring 52 and having a lower end fixed to a wheel carrier 53 pivotally supporting a wheel 50 and an upper end supportably connected with a vehicle body 54; and a lower arm 56 connecting a lower side of the wheel carrier 53 to a lower side of the vehicle body 54.

A section of the wheel's up-and-down movement is determined by the lower arm 56 during a wheel's up-and-down vibration. The vibration is absorbed by an elastic bushing 57 of the vehicle body-side connecting portion of the lower arm. The impact from the road surface is absorbed by the shock absorber 51 and spring 52 of the strut assembly 55.

However, considering the operational steps of the above-described suspension system, when the wheel vibrates upward and downward in accordance with travelling conditions, the wheel moves upward and downward by a predetermined length of the lower arm. Thus, the wheel moves upward and downward according to a tracing movement M which is formed by the length of the lower arm and the sliding movement of the strut arm. The camber angle is changed according to the wheel's up-and-down movement and has a great effect on ride comfort, cornering safety, and running stability.

That is to say, since the wheel side end connection portion of the lower arm 56 is designed to be disposed at the lower side of the wheel center, when the wheel moves upward along the tracing movement M in a normal ascending section, the lower side of the wheel is pushed outward along the curvature of the tracing movement M, whereby the wheel is changed to a negative (−) camber.

However, in the section over the normal ascending section, that is, after the wheel 50 passes a predetermined height, the lower arm 56 ascends while pulling the lower side of the wheel according to its tracing movement, such that the camber angle of the wheel is changed again to a positive (+) camber.

The change of the camber as described above is illustrated by the broken line of FIG. 4A which will be described in detail in the description of the invention. Further, the tread is changed as illustrated by the broken line of FIG. 4B by a change in the camber, whereby the steering characteristics and running stability are adversely affected.

SUMMARY OF THE INVENTION

The present invention has been made in an effort to solve the above-described problems.

Accordingly, an object of the present invention is to provide a suspension system which can simultaneously enhance ride comfort, cornering safety and running safety by optimally controlling a change of camber in accordance with travelling conditions.

To achieve the above objects, the present invention provides a suspension system for a vehicle comprising: a wheel carrier for supporting a wheel; a strut assembly formed by uniting a shock absorber and a spring, said strut assembly including a lower end integrally connected with the wheel carrier and an upper end supportably connected with a vehicle body; a lower arm for connecting a lower side of the wheel carrier to the vehicle body or a subframe; means for controlling the camber by gradually pushing the lower arm outward when the lower arm moves upward, said means being formed at the vehicle body side connecting portion of the lower arm and including a bracket having an arcuate elongated hole having an upper portion inclined outward, an elastic bush having an eccentric axle hole and inserted in the vehicle body side connecting portion of the lower arm, and a roll member projected from a portion of the lower arm which corresponds to the elongated hole and inserted into the elongated hole.

BRIEF DESCRIPTION OF THE DRAWINGS

Further objects and other advantages of the present invention will become apparent from the following description in conjunction with the attached drawings, wherein:

FIG. 3 is a schematic diagram showing the operating state of the suspension system in accordance with an embodiment of the present invention;

FIG. 4A is a graph showing the change of camber of a suspension system in accordance with an embodiment of the present invention;

FIG. 4B is a graph showing a change of tread of a suspension system in accordance with an embodiment of the present invention.

DETAILED DESCRIPTION OF THE INVENTION

Figure 1:
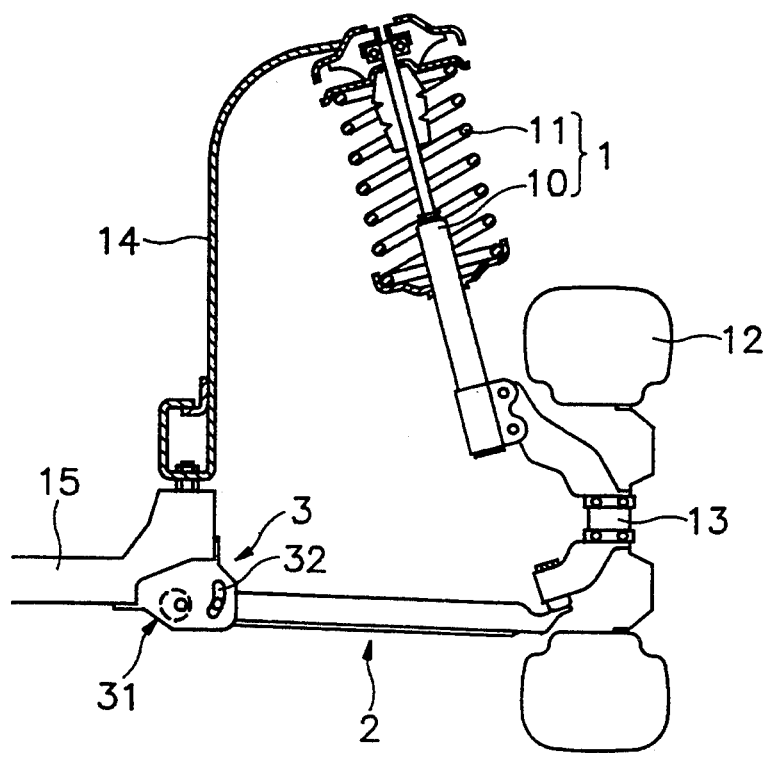
FIG. 1 is a view of a suspension system with an embodiment of the present invention.

FIG. 1 is a view of a suspension system according to an embodiment of the present invention, comprising a strut assembly, shock absorbing means 1, including a shock absorber 10 and a spring 11 having a lower end fixed to a wheel carrier 13 pivotally supporting a wheel 12 and an upper end supporting a vehicle body 14; and a lower arm 2 connecting the lower side of the wheel carrier 13 to a subframe 15.

The lower arm 2 is connected at its vehicle body side end with the subframe 15 by a camber control member 3 which will be described below in detail.

In a vehicle that does not have a subframe, the vehicle body side end of the lower arm 2 can be connected with the vehicle body 14. This embodiment of the present invention relates to a vehicle having the subframe.

Figure 2:
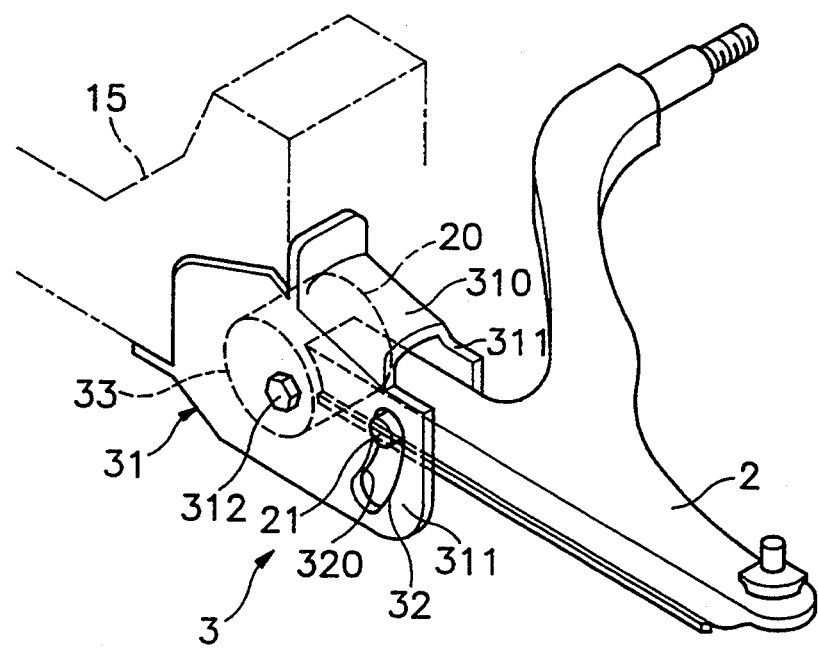
FIG. 2 is a perspective view showing a lower arm of a suspension system in accordance with an embodiment of the present invention.
Figure 5:
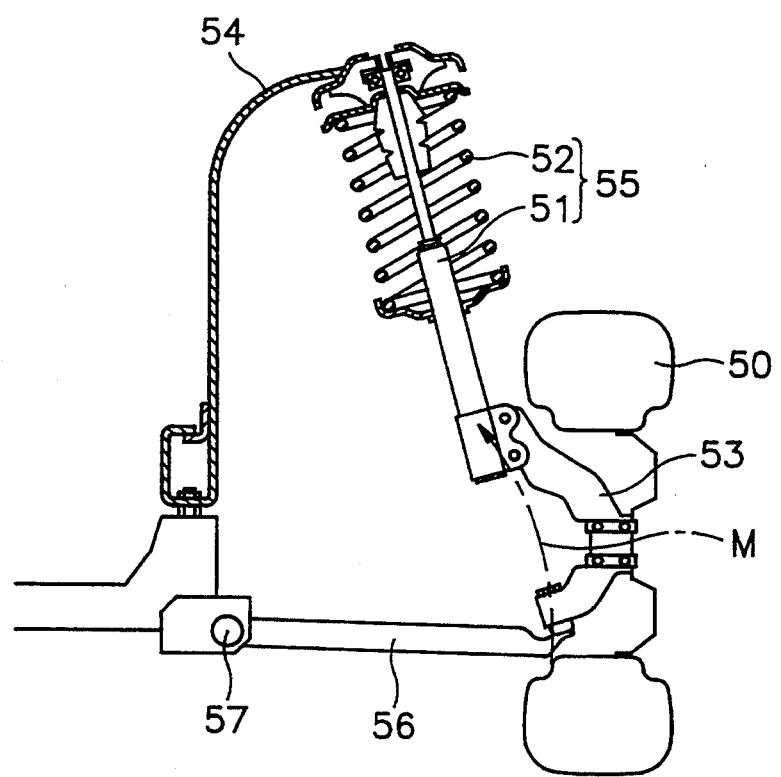
FIG. 5 is a view of a conventional suspension system.

As shown in FIGS. 1 and 2, the camber control member 3 is composed of a bracket 31 which includes support tips or flanges 311, which are integrally connected together at their tip portions with connecting tip or flange member 310. The camber control member 3 is fixed at its inner side with the subframe by way of connecting means, for example, welding.

Further, at the front end of the support tips 311 is formed an arcuate elongated hole or slot 32 having an upper side which is outwardly inclined. At a middle portion of the support tips 311 is formed an axle hole 330 (see FIG. 3), and a bolt 312 penetrates the axle hole in a state where a connecting portion 20 of the lower arm 2 is inserted into the bracket 31 to connect the lower arm 2 to the subframe 15.

An elastic bushing 33, for example, a rubber bushing, is inserted into the connecting portion 20 and is formed with an eccentric axle hole aligned with the axle hole 330 in the support tips 311. The axle hole lies on a line which connects a center point C of the elastic bushing 33 to a longitudinal axis of the lower arm 2.

Further, a roll member 21 projects from a portion of the lower arm 2 at a location which corresponds to the elongated hole 32 and is inserted into the elongated hole 32. It is preferable to form the roll member 21 as a roller.

Accordingly, as shown in FIG. 3, when the wheel 12 moves upward, the lower arm 2 rotates upward, pivoting about the vehicle body side connecting portion 20.

At this point, the roll member 21 would naturally move upward along a tracing movement M. However, according to the present invention, the roll member 21 moves upward along a tracing movement M' formed by the curvature of the inner surface 320 of the elongated hole 32 having the upper portion thereof inclined in the outward direction. At this time, the lower arm moves outward by "b" as shown in a broken line while the vehicle body side of the elastic bushing 33 is compressed.

As described above, when the lower arm 2 moves outward by "b", the lower part of the wheel 12 connected with the wheel side end of the lower arm 2 is pushed outward such that the camber of the wheel is changed to being negative (−).

The change in the camber according to the above operation of the suspension is illustrated by a solid line of FIG. 4A. The change in the camber to a negative (−) is larger than the conventional change in camber which is shown by the broken line of FIG. 4A, such that the cornering ability is improved.

Further, as shown in FIG. 4B, the change of the tread (see the solid line) in accordance with the change in the camber becomes larger than the conventional change in tread (see broken line), such that the steering characteristic is improved.

While the vehicle is running in a straight ahead position, the change of the camber and tread is decreased, such that the ride comfort and the straight running safety are considerably improved.

As described above, according to the present invention, the change of the camber and tread can be adjusted in accordance with the degree of eccentricity of the elastic bushing 33 and the slant angle of the elongate hole 32, whereby the most ideal change in the camber and tread for a vehicle can be easily established.

Although preferred embodiments of the present invention have been described in detail hereinabove, it should be clearly understood that many variations and/or modifications of the basic inventive concepts herein taught which may appear to those skilled in the pertinent art will still fall within the spirit of the appended claims.

What is claimed is:

1. A suspension system for a vehicle having a front side, a rear side, a left side, a right side and a longitudinal axis, the suspension system comprising:
   a wheel carrier supporting a wheel;
   a strut assembly formed by uniting a shock absorber and a spring, said strut assembly including a lower end integrally connected with the wheel carrier, and an upper end supportably connected with a vehicle body; and
   a lower arm pivotally connecting a lower side of the wheel carrier to a subframe of the vehicle body; wherein
   means are provided for controlling the camber of the wheel by gradually pushing the lower arm outward when the lower arm moves upward, said means being formed at a vehicle body side connecting portion of the lower arm and including a bracket attached to the subframe and an arcuate elongated hole having an upper portion inclined in the outward direction formed in the bracket, an elastic bushing having an eccentric axle hole formed therein, the elastic bushing being inserted in the vehicle body side connecting portion of the lower arm, and a roll member projecting from a portion of the lower arm corresponding to said elongated hole and extending into the elongated hole such that said lower arm is pivotally connected to said bracket.

2. The suspension system according to claim 1, wherein the elastic bushing is disposed within the vehicle body side connecting portion of the lower arm such that the eccentric axle hole lies on a line which connects the center point of the elastic bushing to a longitudinal axis of the lower arm.

3. The suspension system according to claim 1, wherein the roll member is a roller.

* * * * *